United States Patent Office 3,292,077
Patented Dec. 13, 1966

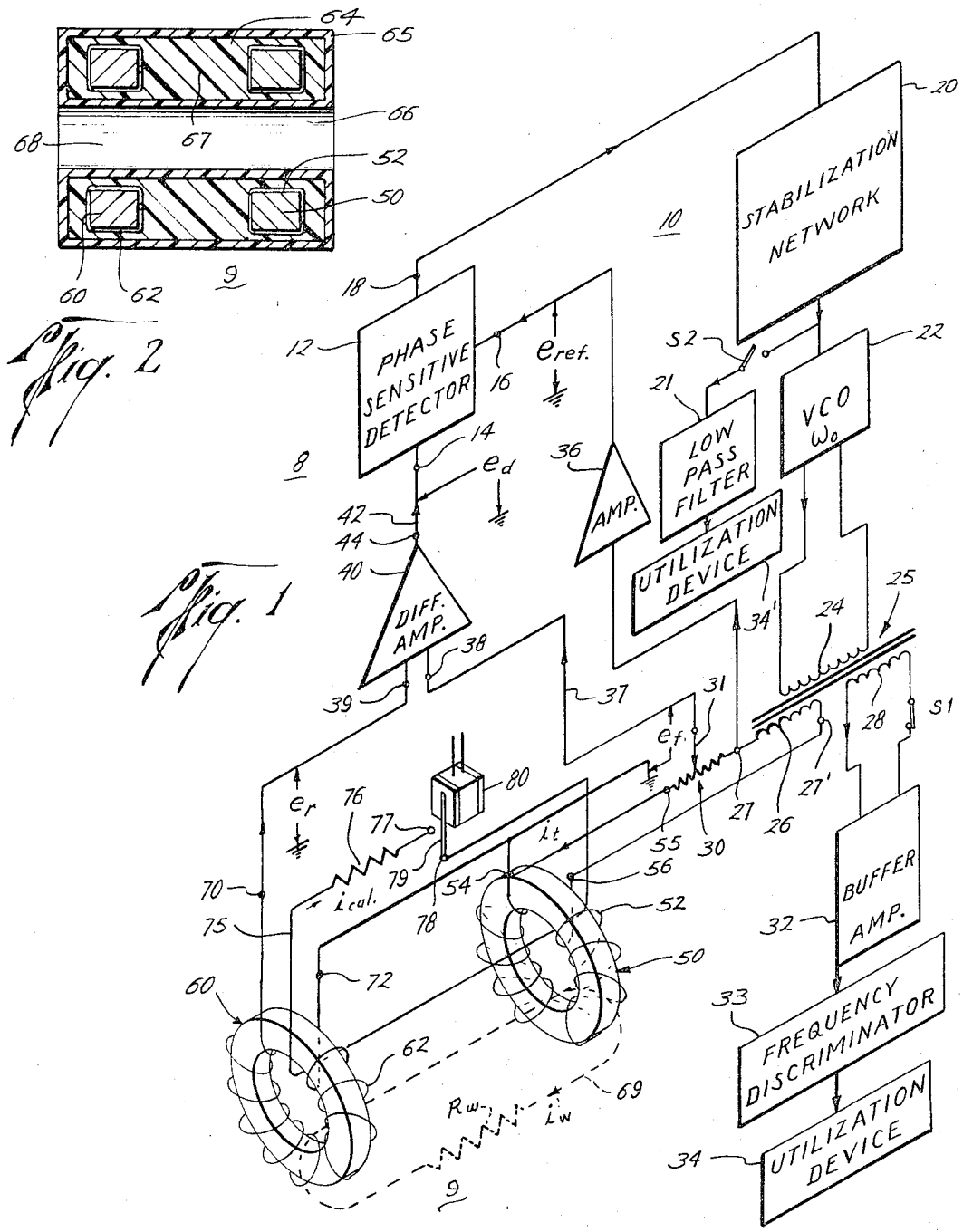

3,292,077
CONDUCTIVITY MEASURING SYSTEM
William J. Sloughter, Houston, Tex., assignor to Schlumberger Well Surveying Corporation, Houston, Tex., a corporation of Texas
Filed Jan. 2, 1963, Ser. No. 249,088
9 Claims. (Cl. 324—30)

This invention relates to conductivity measuring systems for measuring the conductivity of liquids such as sea water.

It is an object of the present invention to provide new and improved, very-accurate conductivity measuring systems which include a phase-locked or servo loop, which can provide to a remote location an alternating current carrier wave frequency-modulated about its center frequency as a function of the measured conductivity, which stably operate under severe environmental physical conditions, which are self-compensating with respect to changes in their electrical operating parameters, which can measure conductivity variations with high accuracy over a relatively wide range, and which are relatively simple and inexpensive to assemble.

The above and other objects of this invention are accomplished by providing new and improved systems for measuring the conductivity of a liquid including a tunable oscillator for providing a carrier signal, a receiver coil immersed in the liquid, means utilizing the carrier signal to induce an alternating potential in the receiver coil, means utilizing the alternating potential and at least a portion of the carrier signal to provide a control signal, and means operatively coupling the control signal to tune the oscillator by an amount and in a direction corresponding to the conductivity of the liquid.

The invention will be better understood after a consideration of the specification taken in connection with the accompanying drawings in which:

FIGURE 1 is a schematic diagram of a preferred embodiment of the conductivity measuring system of the present invention; and FIGURE 2 is a view in cross section of a preferred arrangement for housing the coils shown in FIGURE 1.

For purposes of exposition, the system may be conveniently divided into two units: an electronical unit 8 and a transmitter-receiver coil unit 9.

The electronic unit 8 includes a regulating loop 10, generally known as a servo, feed-back, or phase-locked loop (PLL). Loop 10 typically includes a phase-sensitive detector (PSD) 12 having two input terminals 14, 16 and an output terminal 18, a loop stabilization network 20, and a tunable voltage-controlled oscillator (VCO) 22. The oscillator's frequency changes from a reference or center angular frequency $\omega_0$ by an amount and in a direction dependent on any change occurring in the measured conductivity of the liquid flowing through the transmit-receive coil unit 9 in a manner subsequently described. Conveniently, the output of VCO 22 is coupled to the primary winding 24 of a suitable transformer 25 having two secondary windings 26, 28. Connected in series with secondary winding 26 is a voltage divider 30 having a tap 31.

In one preferred mode of operation, the other secondary winding 28 is allowed to couple through a switch S1 the VCO's output signal to a frequency demodulator 33 through a suitable buffer amplifier 32. The demodulator 33 provides a signal to a utilization device 34, such as a recorder, the signal corresponding to the conductivity of the measured liquid. The potential from terminal 27 is applied to a suitable amplifier 36 preferably having an automatic gain-control circuit in order to assure that its output signal applied to the input terminal 16 of the PSD 12 remains substantially constant. The signal $e_{ref}$ on terminal 16 is taken as the "reference" potential for the system. The signal from tap 31 is applied via line 37 to one input terminal 38 of a differential amplifier 40 having a second input terminal 39. Line 42 connects the output terminal 44 of amplifier 40 to the other input terminal 14 of the PSD 12.

The transmit-receive coil unit 9 may be of known type. To simplify the drawing, only its essential elements are shown. Typically, it includes two coaxially mounted cores 50, 60 of ferromagnetic material, such as powdered molybdenum permalloy having highly stable magnetic properties. A transmitter coil 52 is wound on core 50 and a receiver coil 62 is wound on core 60. Although not shown, electrostatic shields are typically provided around the coils. The shields may be constructed of thin, copper sheets and arranged in a manner to eliminate the possibility of shorted turns. In some installations instead of electrostatic shields, it may be desirable to provide magnetic shields constructed of high permeability material, such as Mumetal.

As shown in FIGURE 2, the cores are mounted in the chamber 64 of a water-proof, insulated, hollow tubular casing 65 also defining an inner cylindrical opening 66 through which the measured liquid 68 can freely flow. To maintain a fixed spaced relationship, the cores are embedded in a suitable potting material 67, such as Hysol 6020. The coils are preferably of toroidal shape since uniformly wound toroidal coils have very little external or leakage magnetic fields. To minimize the inductive coupling between the transmitter and receiver coils 52, 62 due to nonuniformity of the windings and inhomogeneity of the cores, the transmitter coil may be rotated in a known manner with respect to the receiver coil. Other known techniques for minimizing spurious voltages may be also employed. Such techniques may include, for example, the connection of a suitable impedance in series with an auxiliary coil linking both the transmitter and receiver coils 52, 62.

Rigid triaxial cables (not shown) connect the transmit-receive unit 9 to unit 8. A short length of flexible triaxial cable may be also included to provide for relative motion between units 8 and 9. It will be appreciated that the outer conductor of the triaxial cable would be used to connect the electrostatic shields of unit 9 to suitable ground points within unit 8.

When units 8 and 9 are operatively coupled, terminals 70, 72 of coil 62 become connected to input terminal 39 of amplifier 40 and to terminal 54 of coil 52, respectively. Terminal 54 may be grounded as shown. Terminal 55 of voltage divider 30 is connected to terminal 54 and terminal 27' of secondary winding 26 is connected to the other terminal 56 of coil 52.

To check the calibration of the system, there is provided at least a single turn winding 75 coupling both cores 50 and 60, as shown, and accepting in series a calibrate resistor 76 and the contacts 77, 78 of a relay 80 having an armature 79.

In another possible mode of operation of the measuring system of the invention, the output signal of the loop 10 is derived from the output of the stabilization network 20 through a switch S2 and, preferably, a low-pass filter 21 having an output terminal 23 feeding a utilization device 34'.

To simplify the exposition of the operation of the system, it will be assumed that a sinusoidal alternating current having an angular frequency $\omega_0$ is passed through the transmitter coil 52 by the VCO 22. Obviously, other wave forms than sinusoidal can be employed, if desired. The transmitter current induces a voltage in the measured water 68 which is given by:

$$e_w = -j\omega M_1 i_t \qquad (1)$$

where $e_w$ = voltage induced in the water path represented by the dashed closed loop 69;

$M_1$ = mutual inductance between the transmitter coil 52 and the water path 69; and
$i_t$ = current in transmitter coil 52.

Therefore, the current $i_w$ which flows in the water loop 69 is:

$$i_w = \frac{e_w}{R_w} = \frac{-j\omega_0 M_1 i_t}{R_w} \quad (2)$$

where $R_w$ is the distributed electrical resistance of the water loop 69 shown as a lumped resistor. The voltage $e_r$ induced in the receiver coil 62 by the flow of $i_w$ in the water loop 69 is:

$$e_r = -j\omega_0 M_2 i_w = -\frac{\omega_0^2 M_1 M_2 i_t}{R_w} \quad (3)$$

where $M_2$ is the mutual inductance between the water loop 69 and the receiver coil 62.
But $$R_w = G/\sigma \quad (4)$$

where
$G$ = a constant defined by the geometry of the measuring system;
$\sigma$ = conductivity of the water 68 being measured.

Substituting Equation 4 in Equation 3 yields:

$$e_r = -\frac{\omega_0^2 M_1 M_2 i_t \sigma}{G} \quad (5)$$

It will be apparent from FIGURE 1 that a voltage inphase with and proportional to $i_t$ is developed across voltage divider 30. Depending on the position of tap 31, a portion $e_f$ of the oscillator's output signal is supplied to input terminal 38 of the differential amplifier 40; voltage $e_r$ induced in the receiver coil 62 is applied to the amplifier's other input terminal 39. The potential difference between $e_r$ and $e_f$, after being amplified by amplifier 40, appears as $e_d$ on line 42. Signal $e_d$ is the control voltage of which the amplitude is controlled by the servo loop 10. It will be appreciated that the gain of loop 10 is made sufficiently high to assure that $$|e_r - e_f| \approx 0 \quad (6)$$

which makes $e_d$ remain at a substantially constant datum level or value. Equation 5 can be rewritten as $$e_r = k_1 i_t \omega_0^2 \sigma \quad (7)$$

where $$k_1 = -\frac{M_1 M_2}{G} = \text{constant}$$

By Ohm's law $$e_f = k_2 i_t \quad (8)$$

where $k_2$ is a constant depending on the attenuation provided by voltage divider 30. Substituting Equations 7 and 8 into Equation 6 and rearranging terms yields $$\sigma = \frac{k_2/k_1}{\omega_0^2} = \frac{k_3}{\omega_0^2} \quad (9)$$

where $k_3$ is a constant.

Equation 9 is the governing equation of the conductivity measuring system of the preferred embodiment shown in FIGURE 1.

From Equation 7 is should be clear that when the conductivity $\sigma$ increases by $\Delta\sigma_1$, then voltage $e_r$ also increases by a proportionate amount $\Delta e_{r1}$. A corresponding change $\Delta e_{d1}$ will therefore occur in the control signal $e_d$ on line 42 causing a change in potential on output terminal 18 of the PSD 12 which is generally known as the "error" voltage $e_{er}$. After passing through the stabilization network 20, the error voltage $e_{er}$ is applied to the frequency-controlling terminal of VCO 22 thereby causing a change $\Delta\omega_1$ in its operating frequency. The new operating frequency of the VCO will be $$\omega_1 = \omega_0 + \Delta\omega_1 \quad (10)$$

From Equation 7 it will be apparent that the frequency change $\Delta\omega_1$ in the operating frequency of the VCO 22 causes a change $\Delta e_{r2}$ in the voltage $e_r$ induced in the receiver coil 62. The constants of the system are such that $$\Delta e_{r1} + \Delta e_{r2} \approx 0 \quad (11)$$

which assures that the control signal $e_d$ is maintained at substantially its datum value with changes in $\sigma$. Should the conductivity $\sigma$ change again, the VCO 22 would assume a new operating frequency $\omega_2$ in order to keep $e_d$ at its datum level.

Since the frequency of the signal induced in secondary winding 28 is the same as that of the signal in the primary winding 24, it will be readily apparent that to the buffer amplifier 32 is supplied an FM signal frequency modulated about the center frequency $\omega_0$ as a function of the measured conductivity. The discriminator 33 demodulates the FM signal and provides to the utilization device 34 a direct current signal in correspondence with the conductivity of the water 68 under investigation.

To determine the constants and to check the calibration of the system, relay 80 is energized to close its contacts 77, 78 thereby allowing an induced current $i_{cal}$ to flow in the calibrate resistor 76. Current $i_{cal}$ causes a signal to appear across the terminals of the receiver coil 62 in a manner previously explained in conjunction with the water current $i_w$. The resulting induced voltage $e_r$ produces a frequency change $\Delta\omega$ from the center frequency of the VCO 22. By inserting differently valued resistors 76, corresponding frequency changes will result. From these frequency changes a chart of $\Delta\omega$ versus conductivity can be obtained.

While the operation of the conductivity measuring system thus far described detected the conductivity changes in the water loop 69 by demodulating the FM signal provided by the buffer amplifier 32, it will be appreciated that in some applications it may be more convenient to derive the loop's output signal from the output signal of the stabilization network 20 which, from the well-known theory of phase-locked loops, assuming VCO 22 to be linear, is proportional to the demodulated signal provided by the frequency discriminator 33. Inasmuch as the output signal of the stabilization network 20 may contain undesirable spikes, it is preferable to first pass it through a low-pass filter 21 and then to a utilization device 34'. In sum, the desired output of the system, and more specifically of the servo loop 10, can be conveniently derived either from the input or from the output of the VCO 22.

Obviously, many other modifications will readily occur to those skilled in the art. For example, the output transformer 25 can be eliminated and direct connections established between the VCO 22 and the networks connected thereto. While only one reference signal is shown applied to the PSD 12, in practice it may be convenient to employ two reference signals displaced in phase by 180°, in a known manner. The stabilization network 20 may assume various forms but typically it includes an amplifier having between its output and input terminals feedback networks connected in accordance with a predetermined transfer function in dependence upon the desired gain and loop bandwidth. Although for simplicity a voltage divider is used to provide the signal $e_f$, other networks may be employed. The above examples are intended merely to illustrate the great variety of network arrangements possible with the conductivity measuring system of the present invention.

Therefore, while preferred embodiments of the present invention have been disclosed, it will be apparent to those skilled in the art that modifications may be made therein without departing from the scope of the invention as defined in the appended claims.

What is claimed is:
1. In a system for measuring the conductivity of a liquid, a tunable oscillator for providing a carrier signal,
a receiver coil immersed in said liquid,
means utilizing said carrier signal to induce an alternating potential in said receiver coil,
means utilizing said alternating potential and at least a portion of said carrier signal to provide a control signal, and
means operatively coupling said control signal to tune said oscillator by an amount and in a direction corresponding to the conductivity of said liquid.

2. In a system for measuring the conductivity of a liquid,
a tunable oscillator for providing a carrier signal,
a receiver coil immersed in said liquid,
means utilizing said carrier signal to induce an alternating potential in said receiver coil,
means comparing said alternating potential with a reference signal to provide a difference signal tending to change with any change in the conductivity of said liquid,
means operatively coupling said difference signal to tune said oscillator, and
means operatively coupled to said oscillator for deriving an output signal indicative of the conductivity changes.

3. In a system for measuring the conductivity of a liquid,
a tunable signal generator for providing a carrier signal,
a receiver coil immersed in said liquid;
means utilizing said carrier signal to induce an alternating potential in said receiver coil as a function of the conductivity of said liquid;
means comparing said alternating potential with a reference signal to provide a difference signal, said difference signal tending to change with any change in said conductivity;
means utilizing said difference signal to tune said signal generator by an amount and in a direction corresponding to a change in the conductivity of said liquid;
means to discriminate the frequency-modulated wave from the output of said generator and to provide an output signal corresponding to the conductivity changes, and
a utilization device for receiving said output signal.

4. In a system for measuring the conductivity of a substance,
a transmitter coil,
a receiver coil,
a tunable signal generator providing a carrier signal having a center frequency;
means coupling said carrier signal to energize said transmitter coil thereby establishing in said substance a changing magnetic field which generates therein an alternating current in dependence on said conductivity,
said current inducing in said receiver coil an alternating potential;
means comparing said alternating potential with at least a portion of said carrier signal to provide a control signal,
said control signal tending to depart from a datum value with variations in said conductivity; and
means utilizing said control signal to tune said signal generator about its center frequency by an amount and in a direction tending to maintain said control signal at substantially its datum value.

5. In a system for measuring the conductivity of a liquid,
a transmitter coil,
a receiver coil,
both coils being immersed in said liquid;
a tunable signal generator providing a carrier signal having a center frequency,
means coupling said carrier signal to energize said transmitter coil thereby causing an alternating current to flow in said liquid and inducing an alternating potential in said receiver coil;
means utilizing said alternating potential and at least a portion of said carrier signal to provide a control signal, and
means utilizing said control signal to tune said oscillator about its center frequency by an amount and in a direction corresponding to any change in the conductivity of said liquid.

6. A system for measuring the conductivity of a liquid comprising in combination:
a transmitter coil,
a receiver coil,
both coils being immersed in said liquid;
a tunable oscillator providing a carrier signal having a center frequency,
a phase-sensitive detector,
a stabilization network,
means coupling said oscillator, said detector, and said network to form a phase-locked loop;
means coupling said carrier signal to energize said transmitter coil thereby establishing in said liquid a changing magnetic field which generates therein an alternating current in dependence on said conductivity,
said current inducing in said receiver coil an alternating potential;
means comparing said alternating potential with at least a portion of said carrier signal to provide a control signal to one input of said phase-sensitive detector, said control signal tending to depart from a datum value as a result of a change in said liquid's conductivity;
means coupling at least a portion of said carrier signal to another input of said phase-sensitive detector whereby said phase-sensitive detector provides an error signal to said stabilization network corresponding to any departure of the difference between its input signals;
said stabilization network utilizing said error signal to cause a change in said oscillator's frequency from its center frequency by an amount and in a direction tending to maintain said control signal at substantially its datum value, and
means deriving from said loop a signal of which the variations correspond to the variations in the conductivity of said liquid.

7. The system of claim 6 wherein said last-mentioned means include a frequency discriminator coupled to the output of said oscillator.

8. The system of claim 6 wherein said last-mentioned means include a low-pass filter coupled to the output of said stabilization network.

9. In a system for measuring the conductivity of a liquid,
a transmitter coil,
a receiver coil,
both coils being immersed in said liquid;
a tunable oscillator providing a carrier signal having a center frequency,
a phase-sensitive detector,
a stabilization network,
means coupling said oscillator, said detector, and said network to form a phase-locked loop;
means coupling said carrier signal to energize said transmitter coil thereby establishing a changing magnetic field which generates an alternating current in said liquid, the amplitude of said current being dependent on the conductivity of said liquid, and said current inducing an alternating potential in said receiver coil;
means comparing said alternating potential with a least a portion of said carrier signal and providing a control signal to one input of said phase-sensitive detector, said control signal tending to depart from a datum value as a result of a change in said liquid's conductivity;

means coupling at least a portion of said carrier signal to another input of said phase-sensitive detector which provides an error signal to said stabilization network; said stabilization network utilizing said error signal to cause a change in the oscillator's frequency from its center frequency by an amount and in a direction tending to maintain said control signal at substantially its datum value, and means for deriving from a point on said loop a signal corresponding to the conductivity of said liquid.

No references cited.

WALTER L. CARLSON, *Primary Examiner.*

C. F. ROBERTS, *Assistant Examiner.*